United States Patent [19]

Strycharske et al.

[11] Patent Number: 5,934,516
[45] Date of Patent: Aug. 10, 1999

[54] DISPENSER

[75] Inventors: John T. Strycharske, Janesville, Wis.; Gerald A. Bojarski, Durand, Ill.

[73] Assignee: Specialty Equipment Companies, Inc., Rockton, Ill.

[21] Appl. No.: 09/032,449

[22] Filed: Feb. 27, 1998

[51] Int. Cl.⁶ ..................................................... B67D 5/38
[52] U.S. Cl. ........................... 222/158; 222/239; 222/370
[58] Field of Search ..................................... 222/158, 370, 222/239, 240, 241; 604/58; 128/203.15

[56]  References Cited

U.S. PATENT DOCUMENTS

| | | | |
|---|---|---|---|
| 909,657 | 1/1909 | Patterson | 222/239 |
| 1,651,605 | 11/1927 | Kuhn et al. | 222/239 |
| 2,543,934 | 3/1951 | Poskey | 222/9 |
| 2,898,010 | 8/1959 | Tepper | 222/339 |
| 2,901,150 | 8/1959 | Matter | 222/370 |
| 2,914,707 | 7/1959 | Steinmetz | 222/254 |
| 3,101,872 | 8/1963 | Dickinson | 222/197 |
| 3,129,853 | 4/1964 | Hoskins | 222/339 |
| 3,269,612 | 8/1966 | Bode | 222/197 |
| 3,522,902 | 8/1970 | Katz | 222/370 |
| 4,785,976 | 11/1988 | Bennie et al. | 222/370 |
| 4,930,685 | 6/1990 | Landers | 222/370 |

FOREIGN PATENT DOCUMENTS

| | | |
|---|---|---|
| 721907 | 3/1932 | France . |
| 2190655 | 11/1987 | United Kingdom . |

*Primary Examiner*—Henry J. Recla
*Assistant Examiner*—Timothy L. Maust
*Attorney, Agent, or Firm*—Foley & Lardner

[57] ABSTRACT

A dispenser for products such as dessert toppings includes a reservoir for product to be dispensed, a rotatable drum mounted below the reservoir and including a plurality of compartments to be filled from the reservoir. A knob coupled to the drum moves the compartments from loading to dispensing positions, preferably in a single, uni-directional movement. An agitator may be coupled to the drum for insuring complete filling of the compartments and the compartments remain in communication with the reservoir for a portion of each rotation to insure that product completely fills the compartments, even if product bridging may have occurred between uses. A simplified construction allows the dispenser to be readily assembled, disassembled, repaired and cleaned by unskilled workers.

18 Claims, 3 Drawing Sheets

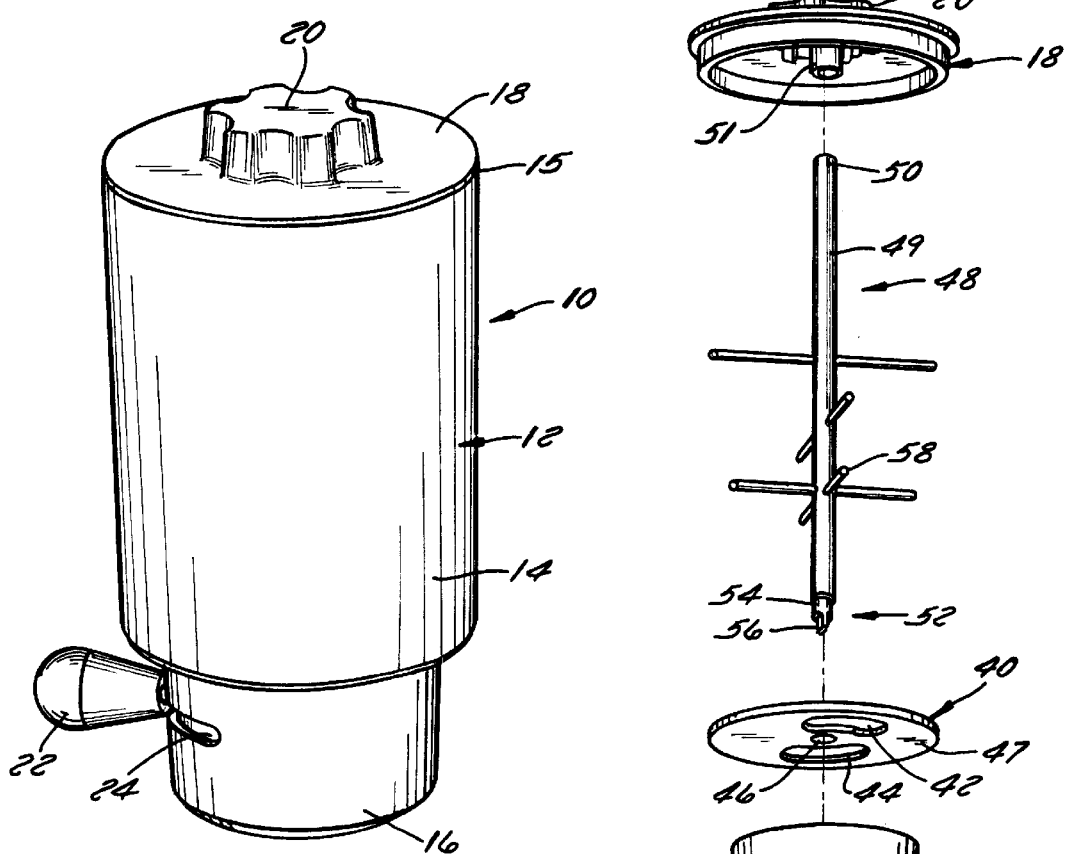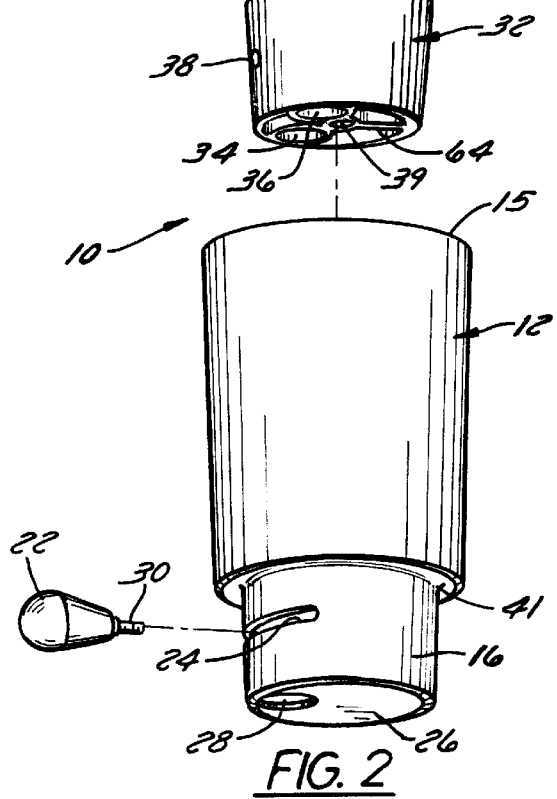

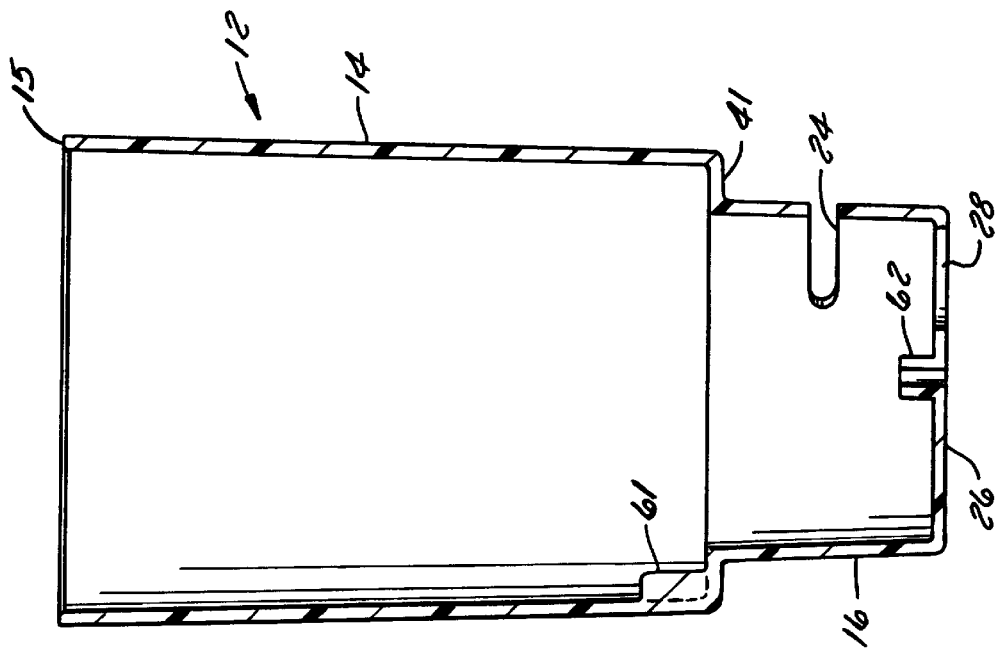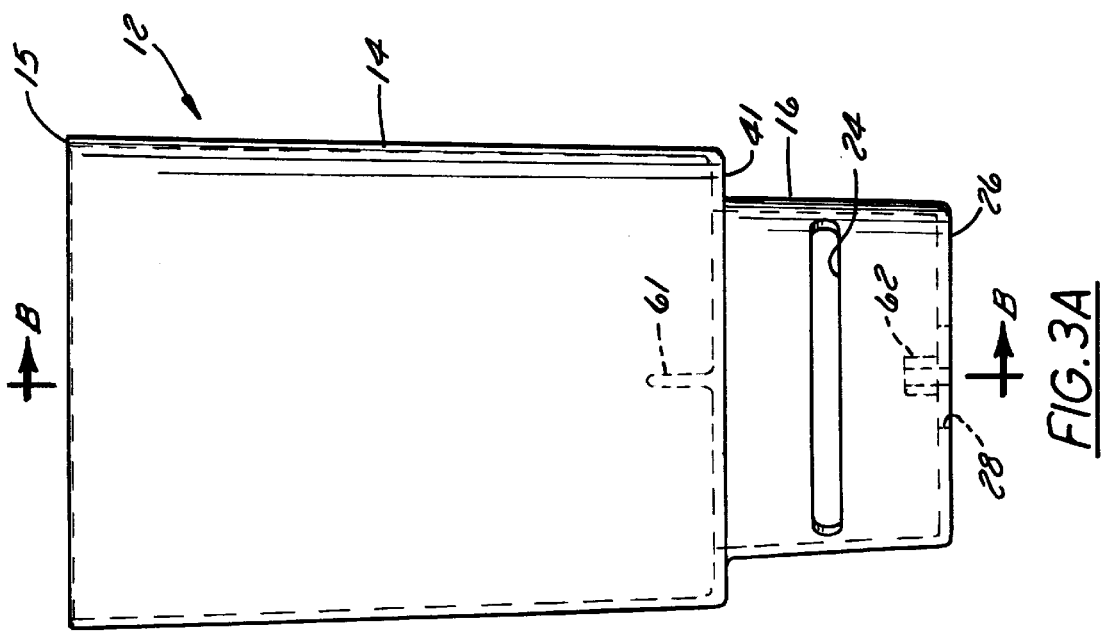

DISPENSER

CROSS REFERENCES TO RELATED APPLICATIONS

If Any: None

BACKGROUND OF THE INVENTION

1. Field of the Invention

The present relates generally to the art of dispensers and more particularly to dispensers useful with food products, such as ice cream and dessert toppings. Still more specifically, the present invention relates to dispensers which load a predetermined quantity of product from a reservoir into a compartment and dispense same when activated by the user.

2. Description of the Prior Art

Many types of dispensers are known to the art for allowing the user to dispense pre-measured quantities of products. Such dispensers are known for use in the medical field, for industrial products such as dry chemicals and for various food products, such as ground coffee, nuts, toppings, candy and the like. Several of such dispensers will be described in this section of the specification. It is also known in the art that an agitator may be deployed in the product reservoir to insure that product contained within the reservoir flows into the measuring compartment.

Many of the prior art dispensers are complex and include a large number of parts which make them expensive, difficult to assemble and difficult to clean. Moreover, certain of the prior art products do not insure complete filling or dispensing of product, especially for products which may become sticky and agglomerate, such as candy toppings used with ice cream or non-dairy drinks and desserts. Exemplary of such toppings which are popular for use with ice cream or soft-serve desserts are candy-covered chocolate pieces, cookie bits, chocolate-covered peanut butter bits and the like. Factors such as temperature and humidity can affect the dispensing of such products, as can the amount of time between dispensing operations.

With some prior art dispensers, the dispensing chambers may fill only partially, even where agitators are provided. All types of products, even non-food products, compact, and flow, when in a compacted condition is difficult. The way in which the product is handled, along with humidity and temperature, which can lead to such a result.

It is also common with many prior art dispensers to have the opening to the chambers be the same size as the entrances to chambers themselves, whereby immediately upon rotation of a chamber from beneath a filling hole, the chamber entrance is closed off from the reservoir.

It would be highly desirable in this art to have a dispenser that is easy to manufacture, assemble, disassemble and use, and that would insure the dispensing of predetermined quantities of a variety of products, especially products which have a tendency to agglomerate, such as toppings.

Exemplary of prior art dispensers is Landers, U.S. Pat. No. 4,930,685, issued Jun. 5, 1990 for "Ice-Dispensing Apparatus And Method", In this dispenser, a rotatable wheel is located at an angle and is positioned in the recess of a sloping front wall. Paddles extend radially outwardly from a shaft and move ice along the front wall of the recesses as the wheel is rotated. Angular arms extend from a shaft to break ice bridges as the shaft rotates with the wheel. This dispenser does not employ individual chambers to load with product, but it does attempt to solve the problems of product bridging through the use of arms.

A "Dispenser For Fluent Materials" is shown in U.S. Pat. No. 4,785,976, issued Nov. 22, 1988 to Bennie, et al. A rotating plate is mounted between upper and lower plates, all of which have orifices formed in them. The orifices of the upper and lower plates are out of register with one another. Product is only dispensed when the intermediate plate is rotating.

Katz, in U.S. Pat. No. 3,522,902 issued Aug. 4, 1970, describes "Non-Bleeding Dispensers For Powdered Material And The Like". Katz provides blades for breaking product bridges and includes a rotating disk having four passageways at the bottom of a receptacle. A tab covers one of the chambers when its contents are being dispensed through a similarly shaped opening in the bottom of the container. Plastic veins in the dispensing head "snap" into place to signal to the operator that the dispenser is in the proper position to yield a measured quantity of powder.

Another item is shown in Hoskins, U.S. Pat. No. 3,129,853, issued Apr. 21, 1964 for "Granular Material Dispensing Device". A screw-on dispenser for a jar of powder, such as coffee creamer, includes an upper plate having a circular opening therein, an intermediate member with a single cylindrical chamber having a diameter matching that of the opening in the upper plate, and a bottom closure offset from that of the upper plate. A coil spring spaces the latter two components, and a screw is arranged axially to hold the assembly together. A tab on the intermediate member is used to rotate the chamber from a loading position to the unloading position, following which the procedure can be repeated by moving the chamber back beneath the single opening in the upper plate.

Another ice dispenser is shown and described in Dickinson, U.S. Pat. No. 3,101,872, issued Aug. 27, 1963, for "Ice Storing And Dispensing Mechanism For Beverage Dispensing Machines And The Like". This device includes a cylindrical reservoir, a motor mounted axially thereof and a shaft passing along the axis of the reservoir. The shaft includes a plurality of radially disposed bars used to maintain the ice in a flowable condition. Four chambers are provided in a rotatable member located at the bottom of the reservoir, each of the chambers having a conical shape, expanding to a larger diameter near to the bottom wall. A cylindrical opening leads from the bottom wall to an ice chute. Another smaller opening is provided to drain water from the ice in the chamber in front of the chute outlet. An ice scraper is provided above the top of the rotatable member and is designed to prevent ice build-up along the outside walls. The ice scraper is held in place by a set screw passing through the wall of the cylinder.

Bode, in U.S. Pat. No. 3,269,612, issued Aug. 30, 1966 for "Measuring And Dispensing Device" illustrates yet another multi-compartment dispenser. The single opening from a jar, the compartments and the single dispenser outlet have the same cross-sections, and the patent relates primarily to providing an effective seal between four elements.

Three other dispensing devices include similar operating principles. They differ in end-use application and relatively minor mechanical detail. In Steinmetz, U.S. Pat. No. 2,944,707, issued Jul. 12, 1960 for "Dispensing Device", a cylinder serves as a reservoir and leads to a threaded coupling. Below the coupling, three rotatable elements are provided, each having a single, cylindrical opening therethrough. They differ in depth. A cylindrical opening having an identical cross-section to the rotatable elements is provided in the bottom plate of the reservoir. A single opening is provided in the bottom of the rotatable unit for dispensing product, this latter opening being offset from the entrance opening. By selection of different alignments of the three rotatable elements, three different measured amounts may be dispensed.

A further "Measuring Dispenser" is described in U.S. Pat. No. 2,901,150, issued Aug. 25, 1959 to Matter. In this device, the top opening of the dispensing member includes a round opening of relatively small cross-sectional area. Disposed beneath that opening are six measuring portions, each being triangular in shape and being substantially larger than the opening. The bottom of the dispenser includes a circular opening offset from the location of the top opening. The rotatable member features a radially extending tab for operating it, and the tab extends about the entire circumference of the dispenser. This is accomplished by providing separate top and bottom halves for the dispenser, and by mounting the device axially for rotation.

Yet another "Measuring and Dispensing Device" is shown in Tepper, U.S. Pat. No. 2,898,010, issued Aug. 4, 1959. This device employs a measuring and rotating member having two generally triangular shaped openings and one closed compartment. A top plate has an opening and is axially rotatable about the device. A mounting spring insures that the top plate is oscillated back to a return position. The device is particularly adapted for use in measuring coffee creamer and the like. The opening into the receiving and measuring areas is somewhat less than the cross section of the compartments themselves.

A pill dispenser is disclosed in the Mar. 6, 1951, U.S. Pat. No. 2,543,934, issued to Poskey and entitled "Bracket For Supporting An Inverted Mason Type Jar Containing Articles To Be Dispensed, Including A Receptacle With Rotary Valve". Four individual chambers are provided for receiving one pill each, the chambers being rotatable about a common axis. A guard plate is mounted between the reservoir and the rotatable member to insure that only one pill will be dispensed at a time.

Another dispenser, this time for food products, is shown in UK Patent Application GB 2 190 655 A, published on Nov. 25, 1987, and entitled "Nut Dispenser." In this device, a nut storage hopper is provided beneath a receptacle, and a flexible rubber component is arranged to level off the amount of nuts within any compartment. Further rotation of a drum results in the discharge of nuts through an opening which is offset from its inlet. The opening from the reservoir is smaller than the measuring compartments.

Finally, French Patent No. 721,907 published Mar. 9, 1932, discloses a dispensing device which includes two measuring compartments having opposed inlets for simultaneous loading. Rotation of the compartments 90° places them into an unloading position. The patent discloses a cap which fits over the receiving area and commingles the two measuring quantities for subsequent use.

While a large number of prior art devices are disclosed in the patent literature, several deficiencies still remain to be solved, most notably the accurate measurement of a large variety of product types from a single dispenser, the breaking of product bridges, the loading of such products in an accurate and easy-to-operate manner, and the construction of such devices in a simplified way to facilitate manufacturer, assembly, installation, repair and cleaning by relatively unskilled workers.

FEATURES AND SUMMARY OF THE INVENTION

The present invention features a dispenser for premeasured quantities of a variety of products, such as ice cream and dessert toppings. The invention further features a dispenser for such uses which is economical to manufacture and which may be readily manufactured, assembled, disassembled, repaired and/or cleaned by unskilled workers.

A further feature of the present invention is a dispenser which includes agitators for breaking product bridges and a measuring chamber opening configuration which facilitates complete filling of the measuring chambers.

A further feature of the present invention is a dispenser which may be made entirely from polycarbonate or other clear plastic materials, and which may be loaded and simultaneously discharged in a single movement of an operating knob in a single direction.

Yet another feature of the present invention is a dispenser which may be assembled from as few as six individual components using a single screw fastener which is part of the operating knob.

A still further feature of the present invention is to provide a clear dispenser affording a good view of the product.

How these and other features of the present invention are accomplished will be described in the following detailed description of the preferred embodiment taken in conjunction with the FIGURES. Generally, however, they are accomplished by providing a reservoir body which preferably is constructed in one piece from a clear plastic resin, such as polycarbonate. The body reservoir includes a first generally cylindrical reservoir portion, a smaller diameter portion which is also generally cylindrical and co-axially arranged with respect to the reservoir, and an end plate on the smaller portion having a single opening for dispensing of material. A drum, preferably having two cylindrical compartments, is disposed within the smaller portion, and a slot is provided in the outer wall of the smaller portion for the insertion of a threaded fastener therethrough. The fastener is secured to the drum for rotating it between two positions and for the simultaneous loading and discharging of material. A plate is located between the two body portions and is locked against rotation by a simple indexing tab. The plate includes openings for sequentially filling each compartment, the openings being larger than the entrance openings of the compartments disposed therebelow. The plate, drum and openings are arranged so that when movement of the drum begins, and for a predetermined amount of rotation thereof, on the order of 5° or more, the chamber will remain in communication with the reservoir. An agitator having a shaft and radially arranged rods is inserted through an opening in the plate and into the drum, so that it rotates with the drum to break any product bridges which may occur in the reservoir. In the most preferred embodiment, the openings of the flat plate are kidney-shaped and beveled to insure more precise filling of the compartments and leveling of product therein, while minimizing product damage.

Other ways in which the features of the present invention are accomplished will become apparent to those skilled in the art after they have read the following Detailed Description. Such other ways are deemed to fall within the scope of the present invention if they fall within the scope of the claims which follow.

DESCRIPTION OF THE DRAWINGS

In the FIGURES described below, like reference numerals are used to denote like components.

FIG. 1 is a perspective view of a dispenser according to the most preferred form of the present invention;

FIG. 2 is an exploded view showing the six components of the dispenser shown in FIG. 1;

FIG. 3A is a cross-sectional view taken along the line A—A of FIG. 2 and showing the interior of the dispenser body;

FIG. 3B is a cross-sectional view taken through the line B—B of FIG. 3 and showing the interior of the dispenser body;

DETAILED DESCRIPTION OF THE PREFERRED EMBODIMENTS

Figure 4:
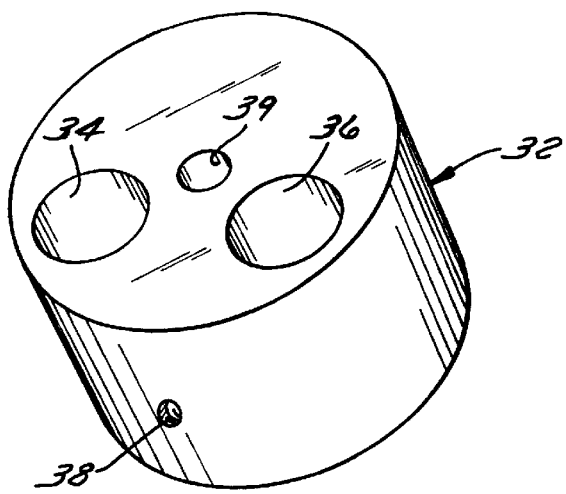
FIG. 4 is a top perspective view of the dispenser drum of the present invention.

Before proceeding to the detailed description of the preferred embodiment and certain alternatives, several comments should be made about the applicability and the scope of the present invention.

First, the preferred material for construction of the dispenser, body, top plate and drum components of the present invention is a clear polycarbonate material, such as Lexan® or equivalent. Other plastic materials may be employed, or the dispenser could include components made from metal or glass.

Second, the dispenser is shown without legs, because in its most preferred applications, it will be mounted on a wall. The dispenser could include a support base, feet or the like to allow it to be self-standing on a work surface or counter top.

Third, in the illustrated embodiment, there are two filling chambers, a single dispensing hole and a method of operation which fills one chamber and dispenses one chamber with a single knob movement in one direction. Other arrangements can be employed, including those which use three or more loading chambers below the main reservoir.

Fourth, the dispenser of the preferred embodiment includes an agitator including a shaft and radially disposed arms. An agitator is preferred in many applications where product bridging can occur, but its use is not essential for the measuring, filling and dispensing processes. Accordingly, the agitator can be eliminated or variously embodied.

Proceeding now to a description of the FIGURES, FIG. 1 is a perspective view of a dispenser 10 according to the most preferred form of the present invention. For ease of illustration, the dispenser is not shown in this FIGURE as being transparent, as is the case with the commercial product of the assignee of the present invention. The internal components, when shown in perspective views, might serve to confuse the reader.

Dispenser 10 includes a body 12 of generally cylindrical configuration. It includes a first larger diameter reservoir 14 and a second smaller diameter portion 16 located at one end of reservoir 14. In the preferred form of the invention, the overall height of the dispenser is approximately 9–12 inches, with reservoir 14 being approximately 6–9 inches long and the smaller diameter portion 16 being approximately 3-inches long.

Reservoir 14 includes an open top 15 and a removable, generally planar top 18 is provided therefor. Grasping knob 20 is provided at a central location on top 18 to facilitate removal and replacement of the top. Also shown in FIG. 1 is an operating knob 22 and a slot 24. It will serve now for purposes of this initial description to indicate that the knob 22 is moved from either end of slot 24 to the other to dispense product from dispenser 10.

FIG. 2 is an exploded view of the six components used to construct dispenser 10 according to its most preferred form. Further reference to body 12 will show that it includes a generally closed end 26 remote from top 15 and that a single opening 28, circular in form, is provided therethrough. This FIGURE also shows a threaded fastener 30 coupled to knob 22 for passing through slot 24 into the inside of dispenser 10. The fastener 30 passes into the drum 32 now to be described.

Rotatable drum 32 fits snugly, but rotatably, within smaller diameter portion 16 and includes a pair of generally cylindrical passageways or compartments 34 and 36. Greater detail concerning drum 32 will be provided in connection with FIGS. 4 and 5. A fastener-receiving hole 38 is provided in a sidewall of drum 32 for receiving fastener 30 of knob 22.

The next component illustrated in FIG. 2 is a plate 40 which is arranged to fit within reservoir portion 14. In operation, it will rest upon the annular web 41 which couples the smaller diameter portion 16 and the larger diameter reservoir portion 14. It will, accordingly, rest very near the upper surface of drum 32.

Plate 40 includes a pair of generally kidney-shaped openings 42 and 44 and a central aperture 46. More will be said later about the placement and shape of the openings 42 and 44. Aperture 46 is aligned with the axis of the drum 32, reservoir 14 and portion 16 and is adapted to receive an agitator.

The final component shown in FIG. 2 is an agitator 48 which includes an elongate, generally cylindrical shaft 49 having an upper or first end 50 and a lower end 52. Upper end 50 is adapted to be received within a boss 51 provided on the inside of knob 20 of the top 18. The lower end 52 includes a generally cylindrical tip 54 and two parallel flats located just inwardly thereof. As will be explained more fully below, tip 54 is inserted through opening 46 of plate 40 and into a seat within drum 32, the flats mating with recesses provided therefor to insure that agitator 48 will rotate each time drum 40 is rotated.

Proceeding next to the description of FIGS. 3A and 3B, both show various features of the body 12 in cross section. In FIG. 3A, the section is taken through line A—A of FIG. 1 and the overall configuration of body 12 becomes readily apparent. Reservoir 14 is gradually tapering from top 15 toward the web 41 coupling it to the smaller diameter portion 16. That portion also is slightly tapered toward closed end 26. The slot 24 is visible along the rear of body 12 as shown in this particular FIGURE. It extends approximately 120° around the axis of body 12.

Two additional features are noted in FIG. 3A, the first being a small tab extending vertically from the area joining reservoir 14 to smaller diameter portion 16 and extending about a half-inch or less upwardly along the wall of reservoir 14. Tab 61 is used to prevent plate 40 from rotating and to receive notch 47 thereof when the components are assembled.

An annular pin 62 also is shown in this FIGURE at the center of bottom 26 and extending upwardly therefrom. Pin 62 is received within the central opening of drum 36 as will be more fully appreciated hereafter.

Proceeding next to FIG. 3B, the same components are shown but in a different view. The bottom opening 28 is more apparent in this view and is preferably located on the same side of the dispenser as slot 24. As will be remembered from the previous discussion, the operating lever or knob 22 and its fastener 30 extend through slot 24 and serve to rotate the drum 32. The drum compartments 34 and 36 will contain product to be dispensed through opening 28, and for most applications it is easier to have the dispensing hole on the same side of dispenser 12 as the slot 24 and knob 22.

Proceeding now to the description of FIG. 4, a top perspective view of the drum 32 is provided. This FIGURE illustrates the relative positioning of the two cylindrical compartments 34 and 36, as well as the threaded opening 38. A central bore 39 is provided through drum 32 except that it is partially closed by a pair of flats as will become apparent from the description of FIG. 5.

Figure 5:
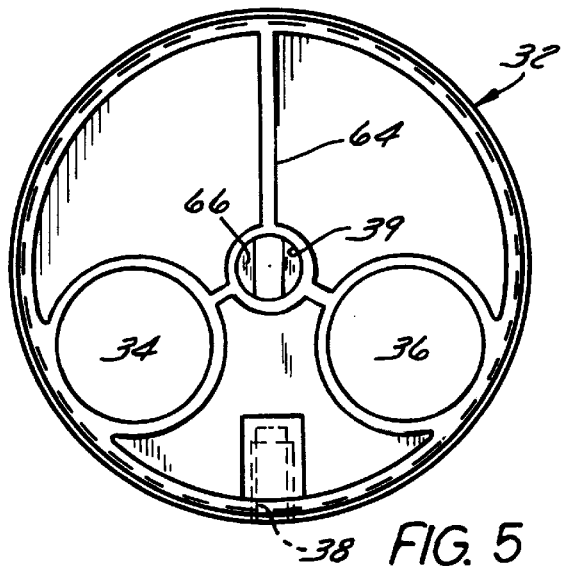
FIG. 5 is a bottom perspective view of the dispenser drum of the present invention.

FIG. 5 shows in phantom the internal construction of drum 32 which is essentially hollow for purposes of material cost reduction. Webbing 64 is provided internally to support the compartments 34 and 36 as well as the annular bore 39. Also shown in FIG. 5 are the flats 66 to mate with the flats 56 of the agitator 48. The exploded view of FIG. 2 should also be examined in connection with appreciating fully the construction of drum 32.

Figure 6:
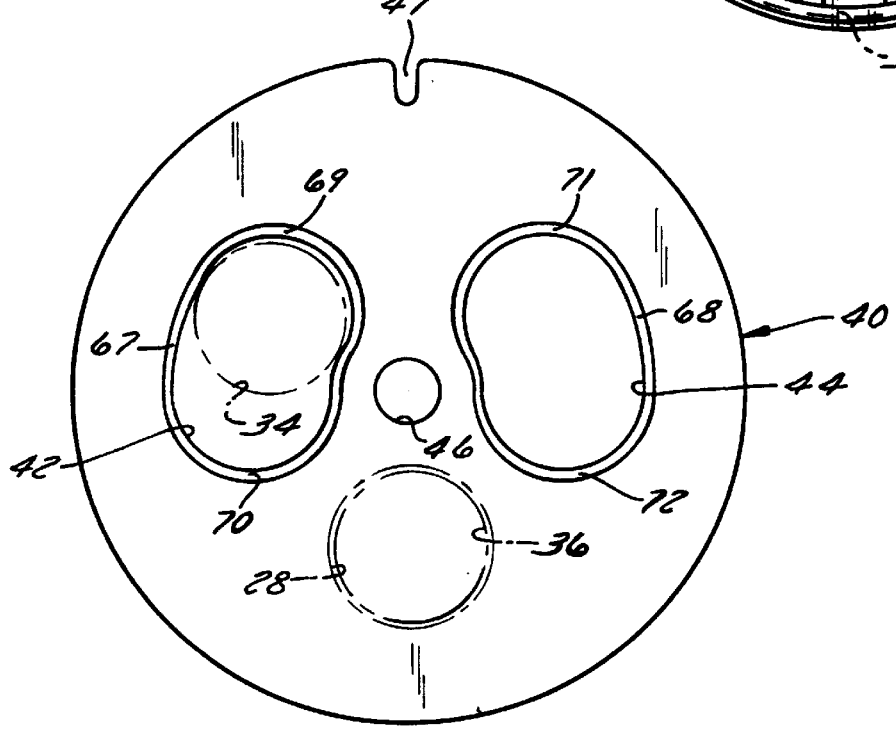
FIG. 6 is a top perspective view of the plate component of the dispenser of the present invention.

Plate 40 is shown in greater detail in FIG. 6 to include a central opening 46 which exceeds slightly the diameter of agitator shaft 49 so that it may pass freely therethrough. The notch 47 is also shown in this FIGURE, and its interaction with the tab 61 on reservoir portion 14 can now be fully understood. The FIGURE also shows in considerable detail the openings 42 and 44 which are generally kidney-shaped and which each include an outer edge 67 and 68 which are generally concentric about the axis of opening 46. The ends of the openings 42 and 44 are indicated by reference numbers 69, 70, 71 and 72. The ends are generally circular and of approximately the same size and are oriented above the entrances to compartments 34 and 36 in drum 32 depending upon its rotation.

To assemble dispenser 10, the drum 32 is first inserted into the smaller diameter portion 16, and the plate 40 is then inserted to rest upon web area 41. Rotation of the plate 40 is prevented by the interaction of notch 47 and tab 61. The agitator shaft 49 is then inserted through the plate 40 and into the central opening 39 of drum 32 to lock the agitator 48 into position. The fastener 30 of knob 32 is inserted through the slot 24 and into the threaded hole 38, following which product may be placed into the reservoir 14. The top 18 is placed on the open end 15 of the reservoir portion 14 to ready dispenser 10 for use.

When the knob 22 is moved to either end of slot 24, one of the compartments 34 or 36 will be placed beneath one of the openings 42 or 44 in plate 40. This will allow that compartment to fill with product from the reservoir portion 14 until it is completely full. Rotation of the drum 32 will allow the entrance of the compartment to remain in communication with the interior of the reservoir portion 14 until it passes beyond the far end of the kidney-shaped opening. For example, if the compartment 34 is oriented below opening 42, so that it lies nearer end 70, rotation of the knob will cause the compartment 34 to move first toward end 69 and then to pass below the plate as rotation continues. This insures that when rotation starts the chamber may continue to fill, especially if any product bridging has occurred. In its most preferred form, the openings 42 and 44 should remain above the entrances to compartments 34 and 36 for at least 5° of rotation, with 5°–25° of rotation being most preferred. Filling is facilitated by the agitator 48 which will also move with initiation of rotation.

It will also be understood at this point in the description that compartment 36 is in a dispensing position illustrated in phantom in FIG. 6, when compartment 34 is in the loading position previously described. When the drum 32 is rotated to the maximum extent possible (i.e. when the knob is moved to the opposite end of slot 24), compartment 36 will pass to a location below opening 44, ultimately toward end 72 thereof for its filling position.

The simplified design of the present invention allows the operator to rotate one compartment from the dispensing position to a filling position with a single movement of the operating knob from one end of the slot to the other. As one compartment reaches the filling position, the other compartment arrives at the dispensing position.

Another aspect plate 40 should be mentioned at this time, namely the bevel around the edge 70 of each of openings 42 and 44. The reduced thickness of plate 40 along the inside of the openings is believed to assist in the leveling off of the product in chambers 34 and 36 and in preventing product damage, such as to delicate cookie pieces, chocolate and the like.

While the present invention has been described above in connection with a preferred embodiment, changes can be made without departing from the spirit or the scope of the present invention. The materials may be changed as indicated above, and the overall size and dimensions can be varied to accommodate a wide variety of dispensing operations. While the dispenser illustrated is relatively small and is used in its first commercial form for restaurant dispensing of toppings, larger scale versions of the dispenser of the present invention could be used for a wide variety of consumer or industrial applications. Accordingly, the present invention is not to be limited by the foregoing description but is to be limited solely by the scope of the claims which follow.

What is claimed is:

1. A dispenser for particulate material comprising:
   a reservoir;
   a drum rotatable about an axis and located below the reservoir, the drum having a round circumference and a pair of compartments for receiving and holding material, each compartment including an upper entrance and a lower exit and the compartments being located adjacent to but spaced apart from one another so that both compartments are on the same side of the drum if the drum was divided vertically by a plane passing through the axis;
   a closure below the drum for retaining material within the compartments, the closure having a dispensing opening therein to permit dispensing of material through the opening only when the opening is aligned with a compartment;

a plate between the reservoir and the drum and including two openings therein, the plate preventing movement of material into the compartments except when a plate opening is aligned with a compartment, the area of each plate opening exceeding the area of the entrance to the compartments; and an operator coupled to the drum and movable between first and second limit positions defined by the ends of a slot to rotate the drum back and forth by a distance equal to the distance required to alternately move the two compartments over the dispensing opening, whereby a complete filling and discharge operation occurs each time the operator is moved between a limit position and the other limit position.

2. The dispenser of claim 1 wherein a slot is provided in a plane perpendicular to the axis and wherein the operator is coupled to the drum and extends through the slot for rotation of the drum between the first and second limit positions.

3. The dispenser of claim 2 wherein the operator comprises a knob having a threaded fastener extending therefrom and wherein a threaded opening is provided in the drum to receive the fastener.

4. The dispenser of claim 1 wherein each plate opening is generally kidney shaped and wherein a compartment entrance remains fully in communication with the reservoir for at least 5° of rotation of the drum about its axis.

5. The dispenser of claim 1 wherein the reservoir comprises the upper portion of a body having a generally cylindrical configuration, the body having a lower portion also of generally cylindrical configuration but of a smaller diameter than the first portion, the closure being a generally circular end wall of the lower portion.

6. The dispenser of claim 5 wherein the drum is located within the lower portion.

7. The dispenser of claim 5 wherein the plate lies within the upper portion and rests upon an annular web coupling the first and second portions of the body.

8. The dispenser of claim 7 wherein the upper portion of the body includes a tab and the plate includes a notch in its periphery, whereby the plate is locked against rotation when the tab engages the notch.

9. The dispenser of claim 7 including means for preventing rotation of the plate with respect to the drum.

10. A dispenser for particulate material comprising:

a body having an upper, generally cylindrical reservoir portion, a lower, generally cylindrical portion coaxial with the reservoir portion and having a diameter less than that of the reservoir portion, a bottom closure for the lower portion having a dispensing opening therein and located between the center and the edge of the bottom closure, the axis being vertical during operation of the dispenser, and an annular web formed in the body between the reservoir and lower portions;

a rotatable drum located within the lower portion, means for rotating the drum about the axis, the drum having two, vertical, generally cylindrical channels extending therethrough, and having entrances and exits, the diameter of the channels being the same as the diameter of the dispensing opening and the channels being arranged such that one or the other of them is located over the dispensing opening when the drum is rotated between a first and a second position;

a plate resting on the annular web and including two plate openings for permitting gravity filling of material into the channels of the drum from the reservoir when a channel is located in alignment with a plate opening, the plate openings being out of register from the dispensing opening;

wherein the area of the plate openings exceeds the area of the channel entrances so that the channel entrances remain in communication with the reservoir for a portion of the rotation of the drum from its first to its second position; and an operator for the drum comprising an outer knob having a threaded fastener coupled thereto, a horizontal slot in the lower portion and a threaded hole in the drum for receiving the fastener, movement of the operator to the ends of the slot defining the first and second positions.

11. The dispenser of claim 10 further including an agitator rotatably coupled to the drum and including an elongate shaft extending through the plate, arms extending radially therefrom and arranged to agitate material in the reservoir portion when the drum is rotated.

12. The dispenser of claim 10 wherein the body, drum and plate are made from a generally clear, plastic material.

13. The dispenser of claim 10 wherein the plate openings are kidney shaped and have first and second ends, the first ends being in alignment with the entrances of a single channel when the drum is in its first or its second position and wherein the entrances of the channels remain in alignment with a plate opening as the drum is initially moved from one of its positions to the other of its positions until the channel entrances pass beyond the second ends of the plate openings, and wherein the amount of rotation of the drum during which the channel entrances remain in communication with the reservoir exceeds about 5°.

14. A dispenser for particulate material comprising:

a body having an upper, generally cylindrical reservoir portion, a lower, generally cylindrical portion coaxial with the reservoir portion and having a diameter less than that of the reservoir portion, a bottom closure for the lower portion having a dispensing opening therein and located between the center and the edge of the bottom closure, the axis being vertical during operation of the dispenser, and an annular web formed in the body between the reservoir and lower portions;

a rotatable drum located within the lower portion, means for rotating the drum about the axis, the drum having two, vertical, generally cylindrical channels extending therethrough, and having entrances and exits, the diameter of the channels being the same as the diameter of the dispensing opening and the channels being arranged such that one or the other of them is located over the dispensing opening when the drum is rotated between a first and a second position;

a plate resting on the annular web and including two bevelled plate openings for permitting gravity filling of material into the channels of the drum from the reservoir when a channel is located in alignment with a plate opening, the plate openings being out of register from the dispensing opening;

wherein the area of the plate openings exceeds the area of the channel entrances so that the channel entrances remain in communication with the reservoir for a portion of the rotation of the drum from its first to its second position; and an operator for the drum comprising an outer knob having a threaded fastener coupled thereto, a horizontal slot in the lower portion and a threaded hole in the drum for receiving the fastener, movement of the operator to the ends of the slot defining the first and second positions.

15. The dispenser of claim 14 further including an agitator rotatably coupled to the drum and including an elongate shaft extending through the plate, arms extending radially therefrom and arranged to agitate material in the reservoir portion when the drum is rotated.

16. The dispenser of claim 14 wherein the body, drum and plate are made from a generally clear, plastic material.

17. The dispenser of claim 14 including an operator for the drum comprising an outer knob having a threaded fastener coupled thereto, a horizontal slot in the lower portion and a threaded hole in the drum for receiving the fastener, movement of the operator to the ends of the slot defining the first and second positions.

18. The dispenser of claim 14 wherein the plate openings are kidney shaped and have first and second ends, the first ends being in alignment with the entrances of a single channel when the drum is in its first or its second position and wherein the entrances of the channels remain in alignment with a plate opening as the drum is initially moved from one of its positions to the other of its positions until the channel entrances pass beyond the second ends of the plate openings, and wherein the amount of rotation of the drum during which the channel entrances remain in communication with the reservoir exceeds about 5°.

* * * * *